Patented Oct. 19, 1954

2,692,197

UNITED STATES PATENT OFFICE 2,692,197

MELTING AND REFINING BY-PRODUCT LEAD

Mortimer C. Denison, Marshallton, Del., assignor to E. I. du Pont de Nemours & Company, Wilmington, Del., a corporation of Delaware No Drawing. Application July 11, 1951, Serial No. 236,267

16 Claims. (Cl. 75—78)

This invention relates to a process for melting and refining impure by-product lead of the character of that obtained by the reaction of an alkyl chloride with a lead-sodium alloy, and particularly that obtained in the manufacture of tetraethyl lead.

It is well known that tetraethyl lead compounds may be prepared by the reaction of an alkyl chloride with a lead-sodium alloy. Such process has been employed commercially for many years in the manufacture of tetraethyl lead by the reaction of an excess of ethyl chloride with lead-sodium alloy. After the reaction is completed, the excess ethyl chloride is distilled from the reaction mass, the reaction mass is drowned in water and the tetraethyl lead is removed therefrom by steam distillation. During such process, the sodium of the alloy is mostly converted to sodium chloride, about 25% of the lead in the alloy is converted to tetraethyl lead, and the remainder of the lead is converted to metallic lead in finely divided form suspended in the dilute solution of sodium chloride. Such suspension is then conveyed to a sludge pit where it is allowed to settle to form an upper layer of an aqueous solution of salt and a lower layer of aqueous sludge which comprises the lead mixed with about 8% to about 20% by weight of the aqueous solution of the salt. The water layer is drawn off and the aqueous sludge is washed with water to remove most of the salt and then dried to remove most of the water. The resulting dried by-product lead is then refined by melting in a reverberatory furnace at from about 700° C., to about 900° C. and separating the molten lead from the slag. The slag, consisting mainly of sodium chloride, lead oxide and lead, is then further treated for reclamation of its lead content. Also, the gases, discharged from the furnace, are treated for the removal of particles of lead dust before being discharged to the atmosphere.

Such prior process for the recovery of lead from the reaction mixture is expensive and hazardous to operate. It requires expensive equipment in the form of a reverberatory furnace made of special and expensive materials and expensive hoods and stacks, because of the high temperatures employed, and also results in the formation of excessive amounts of slag and oxides in the furnace from which the recovery of lead is difficult and costly. Such process is hazardous because of the vaporization of lead compounds and excessive amounts of furnace discharge gases caused by the heating of the impure lead to the high temperatures of 700° C. to 900° C. However, it was the best method known to the art prior to my invention.

The lead that is employed in the manufacture of the lead-sodium alloy is substantially pure and contains no significant amounts of tin, antimony, arsenic or zinc, the specifications requiring less than 0.02% of antimony and arsenic, combined. Therefore, the by-product lead, obtained in the manufacture of tetraethyl lead, is substantially free of such metals, less than 0.0265% by weight of antimony and arsenic combined. However, the by-product lead contains lead chloride and, in some cases, other lead salts, such as lead sulfate, lead sulfide and lead chromate, in a proportion of less than 1% by weight, usually very much less. Also, the lead in the reaction mass is finely divided, the particles having an average diameter of less than 0.1 inch, and is very readily oxidized. Therefore, the surfaces of the particles of the lead become oxidized and thereby coated with lead oxide during the subsequent processing steps, such as drowning of the reaction mixture, steam distillation of the tetraethyl lead therefrom, washing, drying, etc. In practice, the lead oxide will usually be present in an amount from about 2% to about 10% by weight of the by-product lead, frequently as high as about 20% and, in extreme cases, as high as about 30%. By operating under conditions involving a minimum contact with air and other forms of free oxygen, it is possible to keep the amount of lead oxide down to 0.1% to 0.2% by weight. When the by-product lead particles have such coating of lead oxide in a proportion of at least 0.1% by weight, they have an apparent melting point of at least 600° C. Such by-product lead particles start to show a definite liquid layer somewhat above 600° C., which increases as the temperature is raised, being considerable at 650° C. and practically complete at 800° C. It is possible that the metallic lead inside the particles melts at lower temperatures, but that the coating of lead oxide prevents the particles from coalescing to form an observable liquid until the temperature is increased to substantially above 600° C., the apparent melting point. Regardless of the reasons therefor, such high apparent melting point has made it necessary to use temperatures from 700° C. to 900° C. and a reverberatory furnace, with all their attendant disadvantages, in order to melt and refine such by-product lead. By "apparent melting point" as used herein, I mean the temperature at which the by-product lead shows a definite liquid layer of molten lead.

It is an object of my invention to provide a new and improved method for melting by-product lead, of the character of that obtained by the reaction of an alkyl chloride with a lead-sodium alloy, in which the lead particles are coated with at least 0.1% by weight of lead oxide and which has an apparent melting point of at least 600° C. Another object is to provide a method whereby such by-product lead is melted and refined at relatively low temperatures. A further object is to provide a method for melting and refining such by-product lead which can be accomplished in less expensive equipment and in a more simple and economical manner. Other objects are to advance the art. Still other objects will appear hereinafter.

The above and other objects may be accomplished in accordance with my invention which comprises mixing impure by-product lead, of the character of that obtained by the reaction of an alkyl chloride with a lead-sodium alloy, which consists essentially of solid metallic lead particles coated with from 0.1% to about 30% by weight of lead oxide and which coated metallic lead particles have an apparent melting point of at least 600° C., which process comprises mixing such by-product lead with at least 2% by weight of sodium hydroxide, heating the mixture at a temperature of from 327° C., the melting point of metallic lead, to about 450° C. until the lead is melted, settling the molten mixture to form a lower layer of molten metallic lead and an upper layer of molten sodium hydroxide containing the lead oxide, and then separating the layers. Such invention is based upon my discovery that, if such by-product lead is treated with sufficient sodium hydroxide to wet the surfaces of the particles, the particles will melt and coalesce at the normal melting point of metallic lead, molten metallic lead will accumulate at the bottom and the molten caustic will accumulate at the top, carrying with it the lead oxide and other non-volatile impurities in solution and suspension, and will float on the surface of the body of molten lead from which it can be readily separated.

The by-product lead which is to be treated by the process of my invention is of the character of that obtained by the reaction of an alkyl chloride with a lead-sodium alloy and consists essentially of metallic lead particles coated with 0.1% to about 30% by weight of lead oxide and which coated metallic lead particles have an apparent melting point of at least 600° C. Usually, such by-product lead will be that obtained in the manufacture of tetraethyl lead. The by-product lead may be the mixture obtained by drowning the reaction mass in water, which mixture contains large amounts of water and the original amounts of sodium chloride and tetraethyl lead, i. e. about 37.5 parts by weight of NaCl and about 520 parts by weight of tetraethyl lead for each 100 parts of lead. However, it will usually be desirable to employ, as the by-product lead, the wet lead sludge obtained by distilling off most or all of the tetraethyl lead by steam distillation and then settling and decanting the water layer, which lead sludge will contain from about 8% to about 20% by weight of water and from about 2% to about 10% by weight of sodium chloride. Preferably, the by-product lead will be washed to remove most or all of the sodium chloride. When convenient, it will also be preferred to remove most or all of the water.

Generally, the solid portions of the by-product lead will be in the form of small discrete particles and aggregates, i. e. will not contain aggregates materially larger than about 1 inch in diameter. Larger aggregates generally contain small confined pockets of water which tend to vaporize explosively, particularly when suddenly heated. As originally produced in the reaction mass, the lead is in a finely divided form, the particles of lead having an average diameter of less than 0.1 inch. Ordinarily, the majority, roughly about 75%, of the particles have diameters in the range of about 0.003 to about 0.08 inch, although some may be as small as about 10 microns (0.0004 inch). However, during the handling of the material, and particularly during steam distillation and washing, a small proportion of the lead will frequently become aggregated into larger pieces, up to about 1 inch in diameter and sometimes much larger. Such larger pieces should be broken up into small aggregates, as a safety measure.

My process is particularly well adapted for melting and refining compacted by-product lead obtained by the process disclosed by Denison and Whitman in their copending application Serial No. 232,852, filed June 21, 1951. In such application, Denison and Whitman disclose that aqueous lead sludges, obtained in the manufacture of tetraethyl lead, may be subjected to pressures of about 1000 pounds per square inch or more between solid pressure members, whereby most of the water will be squeezed out of the sludges and the particles of lead, coated with lead oxide, are compressed and compacted together (aggregated) in the form of dense flakes, sheets, strips or pellets. Such compacted aggregates usually contain from about 0.5% to about 5% by weight of water, from about 0.01% to about 0.15% by weight of sodium chloride and less than 0.5% by weight of tetraethyl lead. As a safety measure, such compacted lead aggregates of Denison and Whitman are preferably crushed and broken up into small aggregates, preferably having a diameter of less than 0.5 inch, before treating by the process of my invention. Such crushed, compacted lead aggregates also have apparent melting points of more than 600° C.

An amount of sodium hydroxide, sufficient to wet the surfaces of the particles, will cause the by-product lead particles to melt and coalesce at the temperatures employed in my process. However, it is usually preferred to employ an amount of sodium hydroxide sufficient to form a distinct continuous layer of molten caustic on the upper surface of the molten metallic lead. Such amount will, of course, be dependent upon the dimensions of the vessel in which the process is carried out and particularly upon the horizontal cross-sectional area thereof at the level of such layer.

In the course of the process, the impurities in the by-product lead, i. e. the lead oxide, the other lead compounds and the sodium chloride, accumulate in the molten caustic layer, the sodium chloride and part of the lead compounds being dissolved in the sodium hydroxide and part of the lead compounds being suspended in such solution. The viscosity of the molten caustic layer increases with increase in the proportions of such impurities dissolved and suspended therein. Increase in the concentration of sodium chloride in the caustic layer to materially more than 20% by weight tends to make the molten caustic objectionably viscous and difficult to handle. Similarly, increase in the concentration of lead oxide and other lead compounds dissolved and suspended in the caustic layer to materially more than 50% by weight tends to render the caustic layer objectionably viscous and difficult to handle. It is possible to employ proportions of sodium hydroxide which will wet the coated particles of by-product lead and yet will result in a molten caustic layer containing lead compounds and sodium chloride in concentrations materially greater than 50% and 20% by weight, respectively. However, for practical operation, it is usually preferred to employ an amount of sodium hydroxide equal to at least 2 times the weight of the lead oxide and to at least 5 times the weight of the sodium chloride in the by-product lead, so that the final caustic layer will contain not more than about 50% by weight of lead oxide and not more than about 20% by weight of sodium chloride. When the process is operated batchwise, the preferred proportions of sodium hydroxide to lead will usually be from about 2% to about 20% by weight. Such proportions of 2% to about 20% by weight of sodium hydroxide will ordinarily be sufficient to provide a distinct continuous layer of molten caustic containing not more than about 50% of lead compounds and not more than about 20% by weight of sodium chloride. When the by-product lead contains unusually large amounts of lead oxide or sodium chloride or both (materially above 10% by weight, respectively), it will be advisable to correspondingly increase the proportion of sodium hydroxide. Very much larger proportions of sodium hydroxide may be employed, the maximum proportion being limited solely by economic considerations and the capacity of the equipment employed.

The temperature employed should be from 327° C., the melting point of metallic lead, to about 450° C. and, preferably, from about 350° C. to about 400° C. The use of a temperature of from about 350° C. to about 400° C. ensures that the melt will be maintained above the melting point of metallic lead with a minimum of heat. Increase in the temperature up to about 450° C. will slightly increase the speed of the process. The use of temperatures up to about 450° C. permits the process to be carried out in simple and inexpensive vessels and pots made of mild steel and cast iron. On the other hand, the use of temperatures materially about 450° C. will waste heat, require that the equipment be made of more expensive materials, and will have other disadvantages of the prior process, whereby many of the advantages of my process will be lost.

The process will be carried out conveniently in a melt pot or similar vessel made of ordinary mild steel or cast iron. The sodium hydroxide may be added to the by-product lead, the by-product lead may be added to the sodium hydroxide or both may be fed simultaneously into the vessel. During the addition of the ingredients thereto, the vessel may be at the temperature at which the process is to be carried out or it may be at atmospheric temperatures and heated after the addition of the ingredients. Agitation will ordinarily be employed during the addition of the ingredients so as to ensure contact of the sodium hydroxide with the particles of the by-product lead. After the ingredients are mixed, agitation is unnecessary, but will usually be employed, particularly when operated on a large scale, for the purpose of improving heat transfer.

It will generally be preferred to employ anhydrous sodium hydroxide in order to reduce the amount of heat to be supplied to the pot. However, when operating on a large scale, it will sometimes be more desirable to employ the sodium hydroxide in aqueous solution, because it is easier to handle and the advantages thereof may outweigh the disadvantage of the additional heat required to drive off the water. Such aqueous solution may be of any desired concentration, but most conveniently will contain the sodium hydroxide in a concentration of about 30% or more by weight. When such aqueous solution is employed, it may be mixed with the by-product lead and the mixture then gradually heated to boil off the water and then heated further to accomplish the melting and refining. Ordinarily, however, it will be preferred to first add the aqueous solution to the vessel and distill off the water, before the by-product lead is added thereto.

Usually the preferred procedure will be to add the sodium hydroxide to the pot and heat it to the temperature at which the melting and refining of the by-product lead is to be carried out, so as to form a substantial body of molten caustic. The by-product lead will then be gradually fed, in increments or continuously, to the top of the body of molten sodium hydroxide with mild stirring. The by-product lead, because of its weight, will sink through the molten caustic, become molten and refined, and form a body of molten metallic lead beneath the body of molten caustic. At the same time, volatile constituents of the by-product lead, such as water and tetraethyl lead, will be removed by evaporation. Desirably, a substantial body of molten metallic lead will be accumulated beneath the body of molten caustic, and portions thereof withdrawn continuously or intermittently. Before the molten caustic layer becomes too viscous to be conveniently handled, as when the concentration of lead compounds in the molten caustic reach a concentration of about 50% by weight, or, when the sodium chloride in the molten caustic reaches a concentration of about 20% by weight, the molten caustic layer may be removed and replaced by fresh sodium hydroxide, or fresh sodium hydroxide may be added to the molten sodium hydroxide layer, or portions of the sodium hydroxide layer can be removed intermittently or continuously with intermittent or continuous replacement thereof by fresh sodium hydroxide. In such continuous process, it is preferred to mildly stir the layer of molten sodium hydroxide and the body of molten metallic lead, separately. Under the latter conditions, there is but little mixing of the layers and such mixing takes place only at the interface of the layers. The impure caustic, resulting from the process, may be discarded but, preferably, is treated to recover the lead compounds, and the sodium chloride and the sodium hydroxide.

The by-product lead added to the pot or to the sodium hydroxide will usually be at a temperature of from about atmospheric temperature to about 110° C., the temperature at which it is obtained from the distilling, settling, washing or drying steps. It may be at a temperature up to that at which the melting and refining is to be conducted, but to do so requires preliminary heating of the by-product lead, which preliminary heating does not have any advantage which would warrant the cost thereof.

From the preceding, it will be apparent that the sodium hydroxide may be anhydrous or in aqueous solution. It may be pure or of a technical grade, because the impurities commonly present therein, such as sodium carbonate, and the amounts thereof, are without effect on the process. As soon as the process is started, the sodium hydroxide becomes contaminated with lead compounds and, if the by-product lead contains sodium chloride, with sodium chloride.

Accordingly, during the major portion of the process, the sodium hydroxide will contain lead compounds and, usually, sodium chloride which, preferably, will not exceed concentrations of about 50% and about 20% by weight, respectively. When a batch of by-product lead is treated with an excess of sodium hydroxide, additional batches may be treated with the impure sodium hydroxide obtained from the first batch, preferably, until the concentration of lead compounds and sodium chloride therein are increased to about 50% and about 20% by weight, respectively. Therefore, it will be understood that, when I refer to mixing or heating of the by-product lead with sodium hydroxide, I include both anhydrous sodium hydroxide and aqueous solutions thereof including the common impurities in their usual amounts and lead compounds up to about 50% by weight and sodium chloride up to about 20% by weight.

The by-product lead is readily oxidized. Accordingly, the presence of oxygen, as in the air or provided by added oxidizing agents, will tend to increase the amount of lead oxide and hence decrease the yield of purified metallic lead obtained by my process. Therefore, my process is preferably carried out in the absence of air or other added oxidizing agents. For this purpose, the process will ordinarily be carried out in a closed vessel and, preferably, in an atmosphere of an inert gas, such as nitrogen, hydrogen, gaseous hydrocarbons and the like.

When the by-product lead contains more than about 0.5% of tetraethyl lead, it is desirable to avoid exposing such tetraethyl lead to the high temperatures of the process for any longer period of time than is necessary so as to avoid excessive decomposition thereof. This is best accomplished by establishing and maintaining flash distillation conditions, as by feeding the by-product lead slowly to the molten sodium hydroxide and applying vacuum to remove the tetraethyl lead as fast as it is evaporated.

In order to more clearly illustrate my invention, preferred modes of carrying the same into effect and the advantageous results to be obtained thereby, the following examples are given:

*Example I*

By-product lead, consisting essentially of finely-divided lead and lead oxide and which was obtained from a tetraethyl lead reaction mass by steam distillation, was repeatedly extracted first with ethylene glycol monoethyl ether and then with water to remove tetraethyl lead and sodium chloride, respectively, then dried for 2 hours at 110° C. in an atmosphere of nitrogen to minimize the formation of additional oxide. The resulting dried product consisted essentially of about 96% lead, about 4% lead oxide, and a small amount of water and was free of tetraethyl lead and sodium chloride. When heated, it starts to show a definite liquid layer at a temperature somewhat above 600° C., a considerable liquid layer at 650° C., and is practically completely melted at 800° C. About 3,106 grams of this dried solid product was introduced into about 250 grams of molten sodium hydroxide in an iron pot at 400° C., with stirring. After standing for 20 minutes at 400° C., the lead was in the molten state covered with an upper molten caustic layer. The caustic layer, including some suspended material insoluble therein, was removed. Analysis showed the caustic layer to contain 26 grams of free metallic lead and 120 grams of lead in the form of lead oxide, partly dissolved and partly suspended in the molten caustic. The metallic lead, remaining after the removal of the caustic layer, amounted to 2,950 grams.

*Example II*

By-product lead, obtained in the manufacture of tetraethyl lead and which had been washed and dried, analyzed 0.11% tetraethyl lead, 4% $H_2O$, 19.43% PbO, less than 1% lead salts, no sodium chloride, and the rest metallic lead, and became visibly fluid between 600° C. and 800° C. About 3,216 grams of such solid by-product lead was placed in an iron pot to which also was added 488 grams of 30% NaOH solution. The pot was heated gradually to 327°–360° C. and the water driven off. This temperature was held for 15 to 20 minutes, and then the molten metallic lead was drained off. 2,450 grams of metallic lead was recovered, leaving NaOH and slag in the pot.

*Example III*

Wet by-product lead, obtained in the manufacture of tetraethyl lead and containing about 20% water, was compacted and dried by pressure in a cylindrical chamber between two hydraulic rams moving automatically in such a way as to compress a fixed amount of material and expel the resulting briquet, according to the process disclosed by Denison and Whitman in application Serial No. 232,852 filed June 21, 1951. The material was obtained in the form of somewhat porous metallic cylinders, 3 inches in diameter and about 1.5 inches long. These were broken up in a hammer mill to pieces less than 0.5 inch in diameter, in order to eliminate as much as possible the small pockets of water which are sometimes present in the large briquets and which may break open explosively when suddenly heated. The crushed material was then fed at a constant rate by means of a vibratory feeder of standard design to a steel pot with a capacity of 5,500 pounds of lead. The pot was heated by induction and provided with an agitator and with a suction device for removing the fumes containing tetraethyl lead. The crushed material fed contained 2.4% water, no sodium chloride, 2.6% tetraethyl lead, and 0.1% to 0.2% of lead oxide, and did not melt below 600° C.

The pot contained 229 pounds of molten sodium hydroxide which was kept at 400° C. and agitated. 85 pounds of the crushed material was introduced at the rate of 3.9 pounds per minute, and was smoothly converted to molten metallic lead.

118 pounds of the crushed briquets were completely dried in a stream of pure nitrogen, and were then introduced into the remaining caustic in the pot in the same manner as above, with the same results.

In order to show the effect of large amounts of water, similar wet by-product lead, containing 0.1% to 0.2% by weight of lead oxide, was compressed enough to form it into briquets without removing much water. The water content was 13.5%. 75 pounds of such briquets were broken up and similarly introduced into the caustic remaining from the preceding experiments of this example. The excess water was readily eliminated and the melting of the lead took place normally, without foaming or splashing.

It will be understood that the preceding examples are given for illustrative purposes solely and that my invention is not limited to the specific embodiments disclosed therein. The composition of the by-product lead, the proportions and conditions employed, and the procedure of carrying out the process may be widely varied, as indicated in the general description, without departing from the spirit or scope of my invention.

It will be apparent that, by my invention, I have provided a novel process for melting and refining by-product lead of the character of that obtained by the reaction of an alkyl chloride with a lead-sodium alloy, which process overcomes the disadvantages of the process heretofore employed, and which is simpler and more economical to operate and which requires less complicated and expensive equipment. Accordingly, I believe that my invention constitutes a valuable advance in and contribution to the art.

I claim:

1. The process for melting and refining impure by-product lead, of the character of that obtained by the reaction of an alkyl chloride with a lead-sodium alloy, which consists essentially of solid metallic lead particles coated with from 0.1% to about 30% by weight of lead oxide and which coated particles have an apparent melting point of at least 600° C., which process consists essentially in mixing such by-product lead with at least 2% by weight of sodium hydroxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

2. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in mixing such by-product lead with at least 2% by weight of sodium hydroxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

3. The process for melting and refining impure by-product lead, of the character of that obtained by the reaction of an alkyl chloride with a lead-sodium alloy, which consists essentially of metallic lead in the form of small discrete solid particles and aggregates having an average diameter of less than 0.1 inch coated with from 0.1% to about 30% by weight of lead oxide and which coated particles and aggregates have an apparent melting point of at least 600° C., which process consists essentially in mixing such by-product lead with at least 2% by weight of sodium hydroxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

4. The process for melting and refining impure by-product lead, of the character of that obtained by the reaction of an alkyl chloride with a lead-sodium alloy, which consists essentially of metallic lead in the form of small discrete solid particles and aggregates coated with from about 1% to about 20% by weight of lead oxide and which coated particles and aggregates have an apparent melting point of at least 600° C., which process consists essentially in mixing such by-product lead with at least 2% by weight of sodium hydroxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

5. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in mixing such by-product lead with sodium hydroxide in an amount equal to at least 8% by weight of the lead and to at least twice the weight of the lead oxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

6. The process for melting and refining impure by-product lead, of the character of that obtained by the reaction of an alkyl chloride with a lead-sodium alloy, which consists essentially of metallic lead in the form of small discrete solid particles and aggregates coated with from about 1% to about 20% by weight of lead oxide and which coated particles and aggregates have an apparent melting point of at least 600° C., which process consists essentially in mixing such by-product lead with sodium hydroxide in an amount equal to at least 8% by weight of the lead and to at least twice the weight of the lead oxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

7. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in mixing such by-product lead with at least 2% by weight of sodium hydroxide, heating the mixture at a temperature of from about 350° C. to about 400° C. until the lead is melted, settling the molten mixture to form a lower layer of molten metallic lead and an upper layer of molten sodium hydroxide containing the lead oxide, and then separating the layers.

8. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in mixing such by-product lead with sodium hydroxide in an amount equal to at least 8% by weight of the lead and to at least twice the weight of the lead oxide, heating the mixture at a temperature of from about 350° C. to about 400° C. until the lead is melted, settling the molten mixture to form a lower layer of molten metallic lead and an upper layer of molten sodium hydroxide containing the lead oxide, and then separating the layers.

9. The process for melting and refining impure by-product lead, of the character of that obtained by the reaction of an alkyl chloride with a lead-sodium alloy, which consists essentially of from about 0.5% to about 20% by weight of water, from about 0.1% to about 20% by weight of sodium chloride, not more than about 0.5% by weight of tetraethyl lead and the rest metallic lead in the form of small discrete solid particles and aggregates coated with from 0.1% to about 30% by weight of lead oxide and which coated particles and aggregates have an apparent melting point of at least 600° C., which process consists essentially in mixing such by-product lead with at least 2% by weight of sodium hydroxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

10. The process for melting and refining impure by-product lead, of the character of that obtained by the reaction of an alkyl chloride with a lead-sodium alloy, which consists essentially of from about 0.5% to about 20% by weight of water, from about 0.1% to about 20% by weight of sodium chloride, not more than about 0.5% by weight of tetraethyl lead and the rest metallic lead in the form of small discrete solid particles and aggregates coated with from about 1% to about 20% by weight of lead oxide and which coated particles and aggregates have an apparent melting point of at least 600° C., which process consists essentially in mixing such by-product lead with at least 2% by weight of sodium hydroxide, heating the mixture at a temperature of from the melting point of metallic lead to about 450° C. until the lead is melted, settling the molten mixture to form a lower layer of molten metallic lead and an upper layer of molten sodium hydroxide containing the lead oxide, and then separating the layers.

11. The process for melting and refining impure by-product lead, of the character of that obtained by the reaction of an alkyl chloride with a lead-sodium alloy, which consists essentially of from about 0.5% to about 20% by weight of water, from about 0.1% to about 20% by weight of sodium chloride, not more than about 0.5% by weight of tetraethyl lead and the rest metallic lead in the form of small discrete solid particles and aggregates coated with from about 1% to about 20% by weight of lead oxide and which coated particles and aggregates have an apparent melting point of at least 600° C., which process consists essentially in mixing such by-product lead with at least 2% by weight of sodium hydroxide, heating the mixture at a temperature of from about 350° C. to about 400° C. until the lead is melted, settling the molten mixture to form a lower layer of molten metallic lead and an upper layer of molten sodium hydroxide containing the lead oxide, and then separating the layers.

12. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in gradually feeding such by-product lead to the top of a body of molten sodium hydroxide maintained at a temperature of from the melting point of metallic lead to about 450° C. with stirring, and removing molten metallic lead from below the body of molten sodium hydroxide containing the lead oxide.

13. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in gradually feeding such by-product lead to the top of a body of molten sodium hydroxide maintained at a temperature of from about 350° C. to about 400° C. with stirring, and removing molten metallic lead from below the body of molten sodium hydroxide containing the lead oxide.

14. The process for melting and refining impure by-product lead, of the character of that obtained by the reaction of an alkyl chloride with a lead-sodium alloy, which consists essentially of metallic lead in the form of small discrete solid particles and aggregates coated with from about 1% to about 20% by weight of lead oxide and which coated particles and aggregates have an apparent melting point of at least 600° C., which process consists essentially in gradually feeding such by-product lead to the top of a body of molten sodium hydroxide maintained at a temperature of from about 350° C. to about 400° C. with stirring, and removing molten metallic lead from below the body of molten sodium hydroxide containing the lead oxide.

15. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in gradually feeding such by-product lead to the top of a body of molten sodium hydroxide maintained at a temperature of from the melting point of metallic lead to about 450° C. with stirring until the lead oxide in the molten sodium hydroxide reaches a concentration of about 50% by weight, and removing molten metallic lead from below the body of molten sodium hydroxide containing the lead oxide.

16. The process for melting and refining impure by-product lead, of the character of that obtained by the reaction of an alkyl chloride with a lead-sodium alloy, which consists essentially of metallic lead in the form of small discrete solid particles and aggregates coated with from 0.1% to about 30% by weight of lead oxide and which coated particles and aggregates have an apparent melting point of at least 600° C., which process consists essentially in gradually feeding such by-product lead to the top of a body of molten sodium hydroxide maintained at a temperature of from about 350° C. to about 400° C. with stirring until the lead oxide in the molten sodium hydroxide reaches a concentration of about 50% by weight, and removing molten metallic lead from below the body of molten sodium hydroxide containing the lead oxide.

References Cited in the file of this patent

UNITED STATES PATENTS

| Number | Name | Date |
|---|---|---|
| 1,006,323 | Wemple | Oct. 17, 1911 |
| 1,523,980 | Colcord | Jan. 20, 1925 |
| 1,583,495 | Schleicher | May 4, 1926 |
| 1,827,754 | Kirsebom | Oct. 20, 1931 |
| 2,516,536 | Tschappat | July 25, 1950 |